July 3, 1951  W. MACDONALD  2,559,163
IDENTIFICATION AND SIGNALING DEVICE FOR VEHICLES
Filed Jan. 17, 1949  2 Sheets-Sheet 1
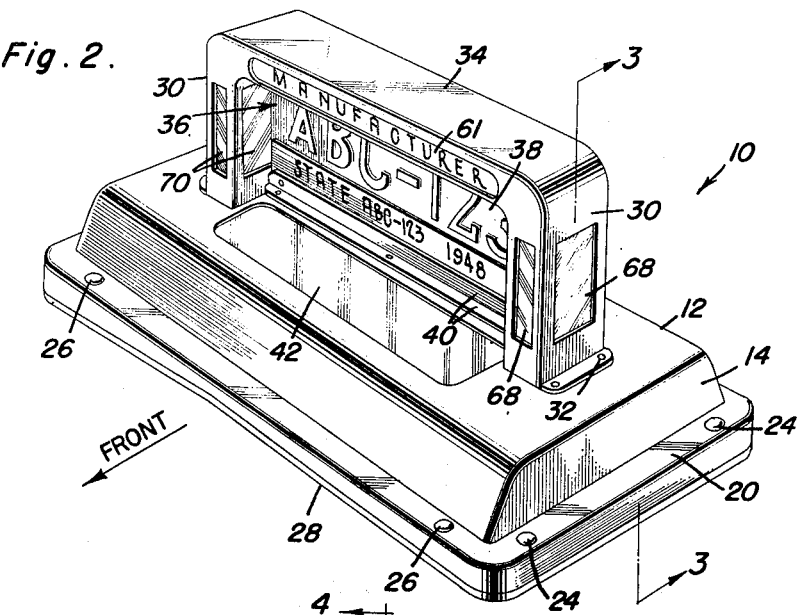
Fig. 2.
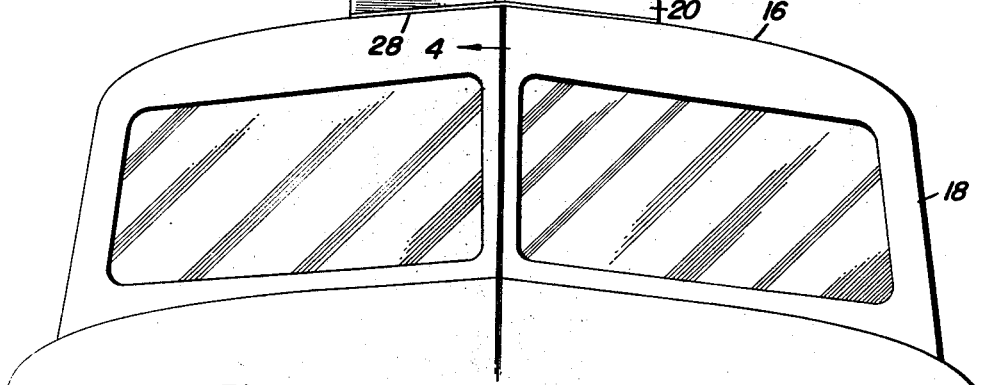
Fig. 1.
Inventor
Wallace Macdonald
By 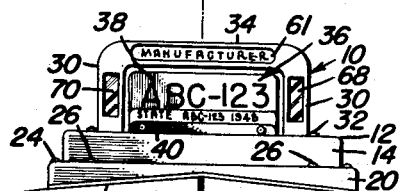
Attorneys July 3, 1951
W. MACDONALD
2,559,163
IDENTIFICATION AND SIGNALING DEVICE FOR VEHICLES
Filed Jan. 17, 1949
2 Sheets-Sheet 2
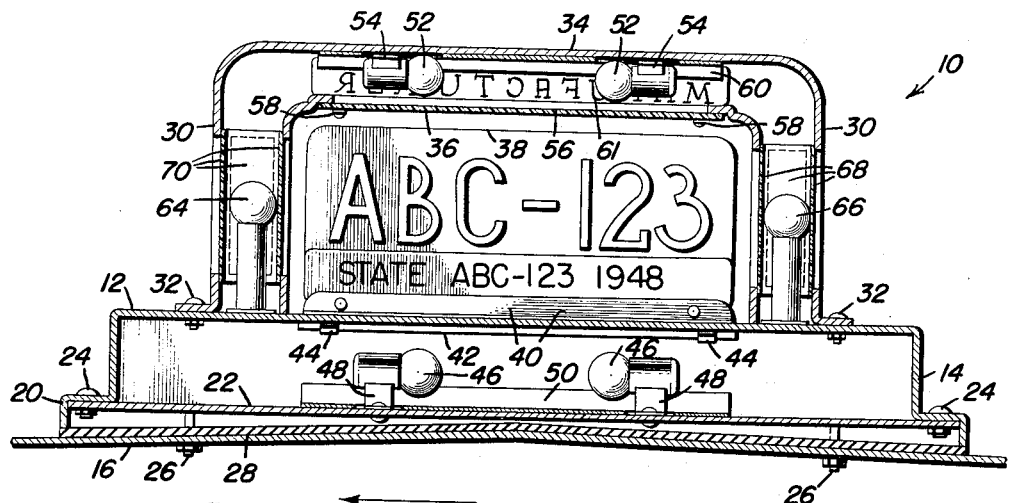
Fig. 3.
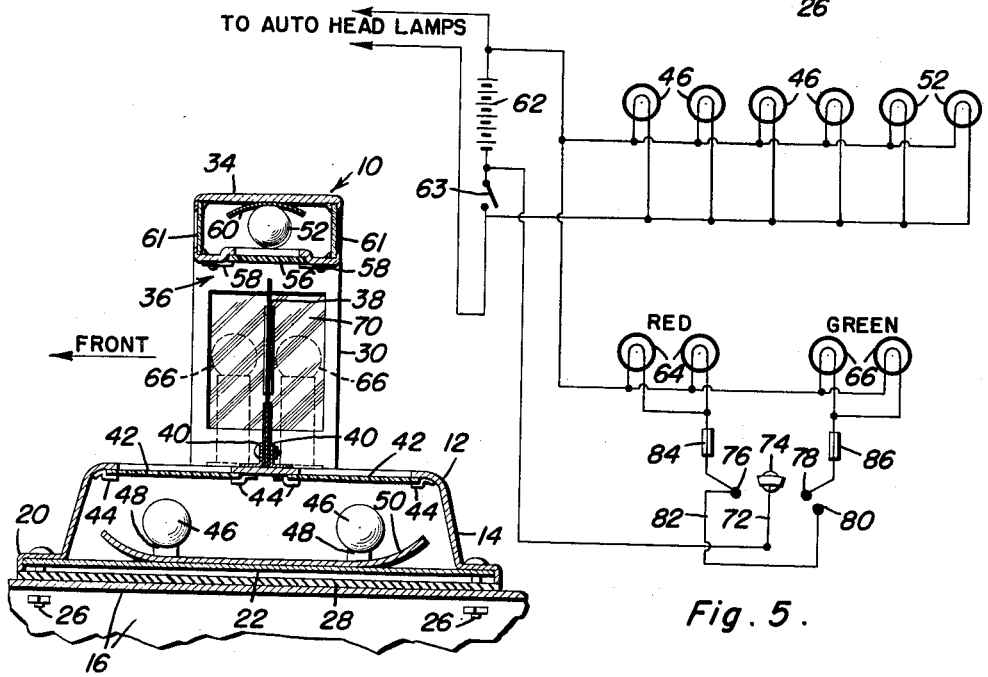
Fig. 4.
Fig. 5.
Inventor
Wallace Macdonald
By Clarence A. O'Brien
and Harvey B. Jacobson
Attorneys Patented July 3, 1951

2,559,163

UNITED STATES PATENT OFFICE 2,559,163

IDENTIFICATION AND SIGNALING DEVICE FOR VEHICLES

Wallace Macdonald, Long Beach, Calif.

Application January 17, 1949, Serial No. 71,352

6 Claims. (Cl. 177—329)

This invention relates to new and useful improvements and structural refinements in combined identification and signaling devices for vehicles such as automobiles, trucks, etc., and the principal object of the invention is to substantially improve the identification of the vehicle and to facilitate directional and other signaling to other vehicles which may be following or approaching from various directions.

In particular, the invention contemplates clear, distinct and convenient identification of a vehicle by means of a conspicuously displayed license plate unit and by means of other plates or panels bearing the name of the manufacturer of the vehicle, while the signaling feature is intended to indicate the direction in which the vehicle is to turn, a warning for other vehicles not to pass, as well as the presence of the vehicle itself on the highway.

An important feature of the invention resides in the provision of the identification and signaling device on the roof of the vehicle, so that it may be readily and conveniently observed from all directions.

Another feature of the invention resides in the provision of lamps for illuminating the identification means as well as the signaling means, the various lamps being arranged in selectively energizable sets.

Some of the advantages of the invention reside in its simplicity of construction, in its pleasing appearance, in its adaptability for use on vehicles of various types, and in its adaptability to economical manufacture.

With the above more important objects and features in view, and such other objects and features as may become apparent as this specification proceeds, the invention consists essentially of the arrangement and construction of parts as illustrated in the accompanying drawings, in which:

Figure 1 is a front elevational view of the invention in situ on the roof of an automobile;

Figure 2 is a perspective view of the invention per se;

Figure 3 is a cross sectional view, taken substantially in the plane of the line 3—3 in Figure 2;

Figure 4 is a cross sectional view, taken substantially in the plane of the line 4—4 in Figure 1; and Figure 5 is a wiring diagram of the electrical apparatus used in the invention.

Like characters of reference are employed to designate like parts in the specification and throughout the several views.

Referring now to the accompanying drawings in detail, the invention consists of a combined identification and signaling device designated generally by the reference character 10, the same being primarily intended for use on vehicles such as automobiles, or the like, and embodying in its construction a housing 12 which includes an elongated base 14 adapted for positioning transversely and substantially centrally on the roof 16 of a vehicle 18, to which end the base portion 14 of the housing may be formed at the lower edge portion thereof with a stepped perimetric flange 20, as will be clearly apparent. A bottom 22, positioned in the base portion 14, is secured to the perimetric flange 20 as at 24, and suitable bolts or screws 26 also extend through the flange 20, bottom 22, and through the roof 16, whereby the entire device is firmly secured to the roof of the vehicle. If desired, a suitable gasket or pad 28 may be interposed between the device and the roof for obvious reasons.

A pair of transversely spaced side members 30 extend upwardly from the base portion 14 to which they are secured as at 32, while the upper ends of the side members 30 are connected together by a cross member 34. If desired, the members 30, 34 may be formed integrally and may assume an inverted U-shaped configuration, substantially as shown.

It is to be noted that the members 30, 34 coact with the base portion 14 in defining what may be referred to as an elongated opening 36, this being intended to accommodate a license plate unit 38 which may either consist of a pair of conventional license plates positioned back to back, or alternatively, it may assume the form of a single license plate provided on both sides thereof with appropriate inscriptions to identify the vehicle by number, State and year of issue. In any event, matters are so arranged that when the license plate unit 38 is positioned in the opening 36, the inscriptions thereon are visible from all directions, and it may be explained that the license plate unit may be mounted in the opening in any suitable manner, such as for example, by means of suitable angles or brackets 40 secured to the upper surface of the base portion 14.

The upper surface of the base portion 14 is equipped with a set of clear lenses 42 mounted in suitable keepers or retainers 44, these lenses extending forwardly and rearwardly of the license plate unit 38, as is best shown in Figure 4. A set of incandescent lamps 46 is provided in suitable sockets mounted in the base portion 14 of the housing 12 as indicated at 48, so that light rays emanating from these lamps may pass through the lenses 42 and illuminate both sides of the license plate unit 38, as will be clearly apparent. If desired, a suitable reflector 50 may be provided under the lamps 46 in the base portion 14, for obvious reasons.

The lamps 46, of course, illuminate the license plate unit 38 by casting light rays thereon in an upward direction, and since the inscription on the license plate unit usually assumes the form of upraised letters and numbers, means are also provided for casting light rays on the license plate unit in a downward direction, so as to eliminate any possibility of formation of shadows. These means simply assume the form of additional lamps 52 mounted in suitable sockets 54 in the cross member 34 of the housing 12, the light rays emanating from the lamps 52 passing through a lens 56 which is provided in the undersurface of the cross member 34 and is retained in position therein by suitable clips or cleats 58. A suitable reflector 60, may, of course, be provided in the cross member 34, and it is to be noted that the lens 56 extends forwardly and rearwardly of the license plate unit 38 in a similar manner as the lenses 42.

In addition to providing illumination for the license plate unit 38, the lamps 52 perform an additional function, namely, that of illuminating a pair of panels 61 which are suitably mounted in the front and rear surfaces of the cross member 34 and bear the name of the manufacturer of the vehicle.

As will be observed, the lamps 46, 52 are wired in parallel with the lighting circuit of the vehicle which derives its source of current from a battery 62 and is controlled by a suitable switch 63, usually mounted on the instrument panel (not shown) of the vehicle.

The side members 30 of the housing 12 contain additional sets of incandescent lamps 64, 66 and each side member is provided in the front, rear, inner and outer side surfaces thereof with a set of colored lenses 68, 70, the lenses in one side member being of a different color from those in the remaining side member, in other words, the lenses in the left side member are preferably red while those in the right side member are preferably green, so that light rays emanating from the respective lamps 64, 66 are correspondingly colored by the red and green lenses 68, 70, respectively.

The lamps 64, 66 are connected in parallel to the battery 62 and their operation is controlled selectively by means of a switch 72 (see Figure 5), the switch 72 having a neutral terminal 74 whereby no current is supplied to the lamps 64, 66, and also having a terminal 76 and a pair of juxtaposed terminals 78, 80. When the current flows through the switch 72 and through the terminal 76, the red lamps 64 are energized, while when the current flows through the terminals 78, the green lamps 66 are energized, as will be clearly apparent. However, when the switch 72 is so positioned that the current flows simultaneously through the terminals 78, 80, the red lamps 64 as well as the green lamps 66 are energized, this being effected by virtue of a shunt 82 which connects the terminals 76, 80, as shown.

If desired, conventional bi-metallic, automatic "blinking" switches 84, 86 are interposed in the circuit between the respective terminals 76, 78 and the lamps 64, 66, so that these lamps, when energized, issue intermittent visible signals, as will be clearly apparent.

When current flows through the switch 72 and through the terminal 76 so as to energize the lamps 64 in the left hand side member of the housing 12, an indication is given that the vehicle is turning to the left, and conversely, when the lamps 66 in the right hand side member are energized, an indication is given that the vehicle is turning to the right. However, when the current passes through the switch 72 and through both terminals 78, 80, the lamps 64, 66 in both side members of the housing illuminate the lenses 68, 70, whereby a warning is given to any following vehicles that passing should not be attempted.

It will be observed from the foregoing that the device serves in a combined capacity for identifying the vehicle by means of the license plate and by the name of the manufacturer, and for signaling purposes to indicate the direction in which the vehicle is turning and to warn against passing by other vehicles. However, the device possesses another function, which arises from the arrangement of the lenses 42, 56, 68 and 70 which are disposed forwardly as well as rearwardly of the license plate unit 38, so that even though the lamps 64, 66 may not be energized, the light rays emanating from the lamps 46, 52 will pass through the lenses 68, 70 on the innerside surfaces of the side members 30, whereby all the lenses 68, 70 on the side members will become illuminated to a certain extent and a red glow will be visible from all directions on the left side of the device while similarly, a green glow will be visible from all directions from the right side of the device, so that the presence and direction of travel of the vehicle on a highway may be readily observed and determined. In this manner, the identifying and signaling means embodied in the invention are closely associated and cooperate one with the other to produce a unitary result.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. In association with a vehicle including a roof, a signaling device comprising a housing mounted on said roof and including a pair of laterally spaced side members having openings therein, a set of colored lenses provided on the front and rear and inner and outer side surfaces covering the openings of each side member, the lenses on the two side members being of different colors, sets of lamps one set in each side member, and switch means for selectively energizing the sets of lamps.

2. In association with a vehicle including a roof, a signaling device comprising a housing mounted on said roof and including a transversely elongated base portion, a pair of laterally spaced side members extending upwardly from said base portion and having openings therein, and a cross member connecting the upper ends of said side members whereby said members and said base portion define an opening therebetween for receiving a license plate unit, a set of clear lenses provided in the upper surfaces of said base portion, a set of license plate illuminating lamps provided in said base portion under the lenses thereof, a set of colored lenses provided on the front and rear and inner and outer side surfaces of each side member covering the openings therein, the lenses on the two side members being of different colors, and sets of selectively energizable signal lamps one set in each side member, the lenses on the inner and outer side surfaces of said side members extending forwardly and rearwardly of the license plate unit whereby light rays emanating from the license plate illuminating lamps may pass laterally through the lenses on said side members.

3. The device as defined in claim 2 together with a lens provided on the undersurface of said cross member, and a further set of license plate illuminating lamps in said cross member, the lens in said cross member extending forwardly and rearwardly of the license plate unit whereby light rays emanating from said last mentioned lamps may pass laterally through the lenses on said side members.

4. In an identification device adapted for mounting on the roof of a vehicle, the combination of a housing including an elongated base portion, a pair of spaced side members extending upwardly from said base portion, and a cross member connecting the upper ends of said side members whereby said members and said base portion define an opening therebetween, an identification plate unit mounted in said opening, a pair of transparent identification plates provided on the front and rear surfaces of said cross member, sets of lenses on the upper surface of said base portion and on the undersurface of said cross member, said lenses extending forwardly and rearwardly of said identification plate unit, and sets of lamps provided in said base portion and in said cross member for illuminating the identification plates.

5. In association with a vehicle including a roof, a signaling device comprising a housing mounted on said roof and including a transversely elongated base portion, a pair of laterally spaced side members extending upwardly from said base portion and having openings therein, and a cross member connecting the upper ends of said side members whereby said members and said base portion define an opening therebetween for receiving a license plate unit, a set of clear lenses provided in the upper surfaces of said base portion forwardly and rearwardly of the license plate unit, a set of license plate illuminating lamps provided in said base portion under the lenses thereof, a set of colored lenses provided on the front and rear and inner and outer side surfaces of each side member covering the openings therein, the lenses on the two side members being of different colors, and sets of selectively energizable signal lamps one set in each side member, the lenses on the inner and outer side surfaces of said side members extending forwardly and rearwardly of the license plate unit whereby light rays emanating from the license plate illuminating lamps may pass laterally through the lenses on said side members, and switch means for selectively energizing the lamps in the side members when in one of a plurality of positions, and energizing both sets of lamps of the side members when in another position.

6. The device as defined is claim 2 together with a lens provided on the undersurface of said cross member, and a further set of license plate illuminating lamps in said cross member, the lens in said cross member extending forwardly and rearwardly of said license plate unit whereby light rays emanating from said last mentioned lamps may pass laterally through the lenses on said side members, and switch means for selectively energizing the lamps in the side members when in one of a plurality of positions, and energizing both sets of lamps of the side members when in another position.

WALLACE MACDONALD.

REFERENCES CITED

The following references are of record in the file of this patent:

UNITED STATES PATENTS

| Number | Name | Date |
|---|---|---|
| 1,232,037 | Jaminet | July 3, 1917 |
| 1,279,054 | Wescott | Sept. 17, 1918 |
| 1,816,741 | Orester et al. | July 28, 1931 |
| 2,077,585 | Rivers | Apr. 20, 1937 |
| 2,116,416 | Slutsky | May 3, 1938 |
| 2,180,754 | Checkos | Nov. 21, 1939 |
| 2,270,377 | McLauchlin | Jan. 20, 1942 |
| 2,336,905 | Welsh | Dec. 14, 1943 |